April 29, 1969     E. SCHMITT     3,441,072
CAMERA CARRYING CASE

Filed Feb. 16, 1967

EUGEN SCHMITT
*INVENTOR.*

BY *James A Smith*
*Robert W Hampton*
ATTORNEYS

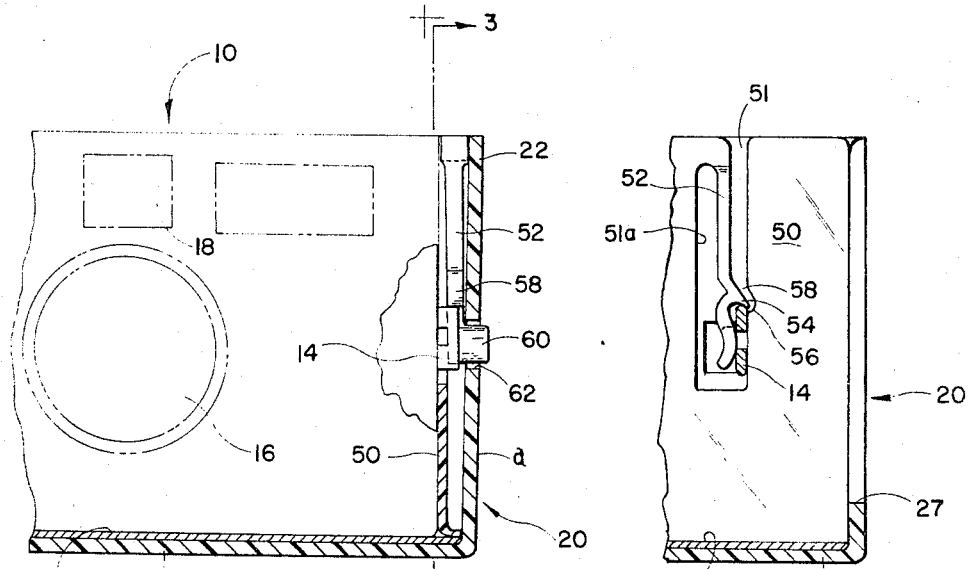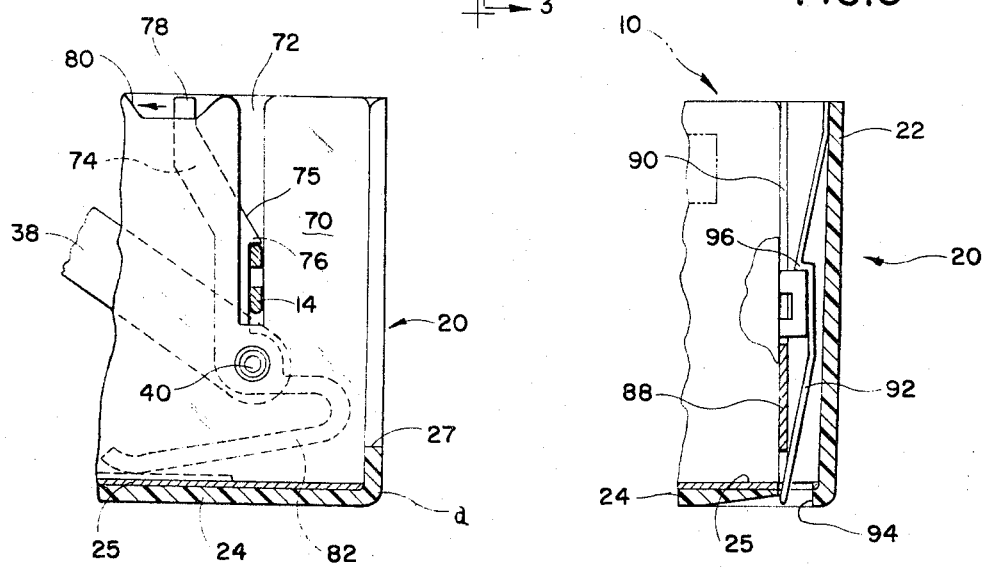

United States Patent Office 3,441,072
Patented Apr. 29, 1969

3,441,072
CAMERA CARRYING CASE
Eugen Schmitt, Stuttgart-Feuerbach, assignor to Eastman Kodak Company, Rochester, N.Y., a corporation of New Jersey
Filed Feb. 16, 1967, Ser. No. 616,619
Claims priority, application Germany, Feb. 18, 1966, K 53,645
Int. Cl. A45c 11/38
U.S. Cl. 150—52                                16 Claims

ABSTRACT OF THE DISCLOSURE

This application discloses a carrying case for a photographic camera. The carrying case includes a locking or latching means arranged to be engaged by the camera to automatically lock or latch the camera within the case. In the disclosed embodiments the latching or locking means generally comprises a movable arm supported on one wall of the case to be engaged and displaced by a surface of the camera upon insertion of the camera into the case. A surface of the movable arm effectively latches or locks the camera within the case. Manually operable means are provided for displacing the arm to release the camera for removal from the case. Reference is made to the claims for a legal definition of the invention.

---

This invention relates to accessories for photographic cameras, and more particularly to an improved camera carrying case.

Camera cases incorporating a means for securing a camera to the carrying case are well known in the art. However, in some typical prior art cases inconvenient manual operations or adjustments are often required to securely retain the camera in the carrying case or to release the camera for removal from the case. For example, some cases incorporate a screw type retaining means which require the locating and starting of a screw into a threaded bore in the camera base. Other cases incorporate complicated locking mechanisms which are difficult to operate and sometimes fail to function after a short period of use.

It is a principal object of the present invention to provide an improved camera carrying case.

Another object is to provide an improved camera carrying case having a latching or locking mechanism for retaining the camera in the case whereby the camera is automatically secured to the carrying case upon insertion into the case.

Another object of the invention is to provide an improved means for retaining a camera within a carrying case.

In the disclosed embodiments of the invention a carrying case defines a case portion for receiving a camera. A camera retaining means is movably supported on the case portion and provided with a spring bias to automatically engage a surface of the camera upon insertion of the camera into the case portion to thereby lock the camera within the case portion.

Other objects and advantages will become apparent from the following description taken in connection with the accompanying drawings wherein:

FIG. 2 is a fragmentary front view in partial section of the carrying case depicted in FIG. 1 with a camera fully inserted therein;

FIG. 3 is a fragmentary view in partial section taken along the line 3—3 of FIG. 2;

FIG. 4 is a fragmentary view in partial section similar to FIG. 3 illustrating another embodiment of a camera case in accordance with the invention; and FIG. 5 is a fragmentary view in partial section similar to FIG. 2 illustrating still another embodiment of a camera case in accordance with the invention.

Figure 1:
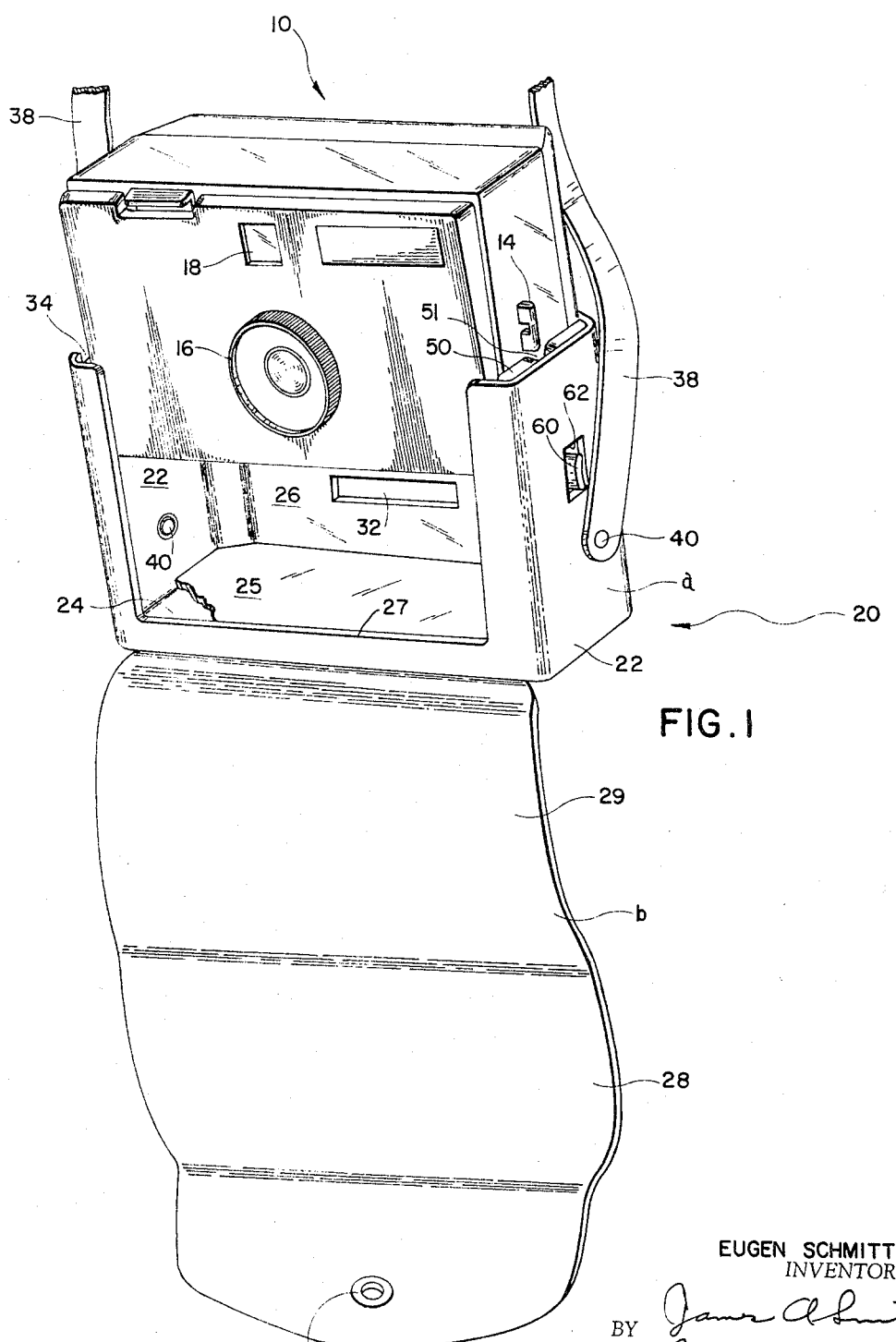
FIG. 1 is a perspective view of a camera partially inserted in a carrying case in accordance with the invention.

The embodiments of the carrying case herein disclosed are intended for use with various photographic cameras such as the Instamatic 50, 100 and 104 cameras, manufactured and sold by Eastman Kodak Company. This particular line of cameras is well known, the general configuration and features being disclosed in various patents and trade circulars, including U.S. Design Patents Nos. 196,084 and 196,085, which issued on Aug. 20, 1963, and are assigned to the same assignee as the present invention. Accordingly, only those camera features which are particularly pertinent to the present carrying case are shown and will be described in detail.

Referring to the drawings there is shown a camera 10 of generally rectangular configuration defining an apertured lug 14 projecting from one side wall thereof, which, as described below, serves to guide the camera into the carrying case and is adapted to be engaged by a retaining means within the case to secure the camera to the carrying case. Camera parts such as the lens 16 and window 18 are shown to more clearly illustrate the orientation of the camera in the carrying case.

As will be apparent to those skilled in the art an apertured lug similar to the lug 14 is typically provided on the aforementioned Instamatic cameras to facilitate the use of a wrist carrying strap. The embodiments of the carrying case in accordance with the invention herein disclosed include a camera retaining means cooperative with such a lug. It is to be understood, however, that the invention is not limited in application to cameras having such a lug and that the camera retaining means may be variously modified to cooperate with camera surfaces of different configuration and location.

Referring to FIG. 1 of the drawings, one embodiment of a carrying case in accordance with the invention is identified generally by the reference numeral 20 and defines a case portion $a$ for slidably receiving the camera comprising a pair of side walls 22, a bottom wall 24, a rear wall 26, and a front face flange 27 defining a front opening which permits use of the camera 10 while it is in the case portion $a$. The case portion $a$ may comprise an integral shell which for example may be molded from suitable plastic materials to possess a fair amount of structural rigidity to facilitate insertion and removal of the camera 10 in the manner hereinafter described. The bottom wall 24 may be provided with a layer of felt 25 as shown to provide a soft seating surface for the camera 10.

The carrying case 20 further includes a cover portion $b$ which in the disclosed embodiments takes the form of a flexible flap having one end fixed to the bottom wall 24. The flap $b$ is adapted to be wrapped around the case 20 and defines upper and front enclosing walls 28 and 29 respectively to thereby enclose the camera 10 when the latter is positioned in portion $a$. To retain the cover portion $b$ in a closed position a snap fastener button 30 is provided on the end portion of the flap for engagement with a complemental socket member (not shown) fixed to the rear wall 26 of case portion $a$.

A suitable opening 32 may be provided in the rear wall 26 of the carrying case to enable the user to view the camera film counter window (not shown) and a recess 34 may be provided in the left side wall 22 for use of the camera film advance lever (not shown). It will be apparent that other openings and recesses (not shown) may be provided as is desired to facilitate use of the camera controls and indicating devices. Such conveniences form no part of the present invention and further description is deemed to be unnecessary.

A carrying strap 38 shown only fragmentarily has its ends fixed to the side walls 22 by rivets 40. The strap may be of the type well known in the art adapted to be looped around the user's neck.

Referring to FIGS. 2 and 3 and the means for retaining the camera 10 within the case 20, a frame insert 50 is suitably fixed to the inside surface of the right hand end wall 22 such as by cement or rivets (not shown) and defines a slot 51 adapted to receive the lug 14 of the camera 10 when the latter is inserted in the case portion a. The slot 51 extends to an enlarged recess 51a in frame 50, the right edge of which is continuous with the right edge of slot 51 as shown in FIG. 3. A camera latching or locking means comprising a flexible arm 52 depends from the upper portion of the frame 50 for movement relative to the frame 50 within the recess 51a. In the embodiment disclosed in FIGS. 2 and 3 the flexible arm 52 is formed integrally with frame 50; however, as will be apparent to those skilled in the art the arm 52 may comprise, for example, a separate part suitably supported on the frame to achieve the function herein disclosed.

The arm 52 defines a latching surface or lip 54 adapted to engage and retain the lug 14 of the camera 10. In the embodiment disclosed the arm 52 is arranged to engage or to be positioned in near engagement with the right hand edge of recess 51a in the free position thereof, a recess 56 being provided in the right hand edge of the recess 51a to receive the lip 54 in said position of the arm.

When the camera 10 is inserted into carrying case 20, the camera lug 14 is received by slot 51 and is displaced downward into recess 51a in contact with the right hand edge of the recess 51a as the camera is positioned into the case. At a predetermined position of the camera during insertion thereof, lug 14 will engage inclined surface 58 of lip 54 and displace the arm 52 to the left against the inherent bias thereof. When the camera is fully inserted in the case in engagement with the bottom wall 24, the upper surface of lug 14 will have moved past the edge of lip 54 as shown in FIG. 3 and the arm 52 will accordingly move to the right under its inherent bias to position the lip 54 over the lug 14 as shown in FIG. 3 to thereby retain the camera 10 in case portion a.

Means for releasing the arm 52 are provided to facilitate removal of the camera from the case. This means comprises an integral extension 60 of arm 52 extending through a slot 62 in the end wall 22 of the carrying case portion a. Displacement of extension 60 within the slot 62 serves to displace the arm 52 to the left as viewed in FIG. 3 to disengage lip 54 from the lug 14 and thereby permit upward displacement of the camera 10 relative to the case portion a.

It will thus be apparent that the arm 52 defines a resilient latching or locking means arranged to automatically engage a surface of the camera upon insertion of the camera in the carrying case. Upon removal of the camera the latching or locking means may be easily released by displacement of extension 60.

Referring to the FIG. 4 of the drawing, I have illustrated another embodiment of the latching or locking means of the camera case 20. In this embodiment a frame insert 70 is also suitably fixed to the end wall of the case 10 similar to the frame 50 of the embodiment depicted in FIGS. 1, 2 and 3. The frame 70 defines an elongated narrow slot 72 adapted to receive the lug 14 of the camera 10. The latching or locking means in this instance comprises an arm or lever 74 pivotally mounted on the frame 70 such as by means of an extension of the rivet 40 as shown in FIG. 4 which also may be utilized to fix the frame 70 to the end wall of the case portion a if desired.

The lever 74 defines a latching surface or lip 76 arranged to engage and retain the lug 14 upon insertion of the camera 10 into the case portion a. The lever 74 further defines an extension 78 extending to the upper edge of the end wall 22 and terminating adjacent a recess or cut-out 80 which permits the extension 78 to be conveniently positioned by the user. The lever 74 further defines a curved flexible extension 82 engaging the bottom surface of the case portion a to bias the lever 74 in a clockwise direction about rivet 40 as viewed in FIG. 4.

In operation of the embodiment disclosed in FIG. 4, when the camera 10 is inserted in the case portion a, lug 14 will be received by slot 72. As the camera is displaced into the case, lug 14 will move downward into engagement with inclined surface 75 of lever 74 to displace the lever 74 counterclockwise as viewed in FIG. 4 against the bias of extension 82. When the upper edge of lug 44 has moved past lip 76 the lever 74 will move clockwise to the position shown in FIG. 4 to position the lip 76 in overlying relationship with the lug 14. To release the lug 14 during removal of the camera 10 it is only necessary to manually displace the extension 78 to effect counterclockwise displacement of the lever 74 about its pivot axis whereupon the camera 10 can be removed from the case portion a.

Referring now to FIG. 5 there is illustrated still another embodiment of the locking or latching means. This embodiment also includes a frame insert 88 supported on the end wall 22 of the case portion a and defining a slot 90 adapted to receive the lug 14. The latching or locking means in this instance comprises a flexible spring arm 92 fixed at one end to the upper portion of wall 22 (such as by rivets not shown) and having the free opposite end thereof extending through a recess 94 in the bottom wall 24 of the case portion a. The arm 92 defines an integral latching surface or lip 96 adapted to engage and retain the lug 14 of camera 10 in a manner similar to the arms 52 and 74 of the previously described embodiments. In this case insertion of the camera 10 into the case portion a will cause lug 14 to engage and displace arm 92 to the right as viewed in FIG. 5 against the inherent bias of the arm 92. When the camera is fully seated in the case portion a arm 92 will move to the left under its inherent bias to position lip 96 over the lug 14 to thereby retain the camera 10 within the case portion a. To remove the camera it is only necessary for the user to displace the free end of arm 92 in opening 94 to position the lip 92 out of engagement with lug 14.

It will be apparent that the frame inserts and latching arms herein described in connection with the various embodiments may be variously formed within the case portion a. Such parts may comprise molded plastic parts for example suitably retained in their respective positions. Moreover these parts may comprise parts molded integrally with the case portion a to the extent permitted by molding techniques.

Although one or more preferred embodiments of the invention have been herein shown and described, it will be apparent to those skilled in the art that many modifications of the structure and arrangement of parts disclosed may be made within the score of the invention as defined in the appended claims.

I claim:

1. A carrying case for a photographic camera defining a surface to facilitate retention of the camera within the case comprising:
   a case portion including bottom and side walls for slidably receiving the camera to enclose at least a portion of the camera;
   retaining means movably supported on said case portion for engaging the camera surface when the camera is received by said case portion;
   means for biasing said retaining means toward engagement with the camera surface to cause said retaining means to automatically engage the camera surface when the camera is received by said case portion; and means for moving said retaining means out of engagement with the camera surface to facilitate removal of the camera from said case portion.

2. In a carrying case for a photographic camera defining a surface to facilitate retention of the camera within the case, the combination comprising:
a case portion including bottom and side walls for slidably receiving the camera to enclose at least a portion of the camera;
an arm movably mounted on said case portion having a spring bias toward a predetermined position for engaging and latching the camera surface upon insertion of the camera into said case portion.

3. A carrying case for a photographic camera defining a surface to facilitate retention of the camera within the case, comprising:
a case portion including bottom and side walls for slidably receiving the camera to at least partially enclose the camera; and
a latching member supported on said case portion and having a camera engaging portion movable into latching engagement with the camera, at least one resilient portion for urging said camera engaging portion toward latching engagement with the camera to automatically latch the camera in said case portion upon insertion thereof, and a manually actuatable portion for moving said engaging portion out of engagement with the camera to facilitate removal of the camera from said case portion.

4. In a carrying case for a photographic camera defining a surface for facilitating retention of the camera within the case, the combination comprising:
a case portion having bottom and side walls and dimensions generally complemental to the camera for slidably receiving the camera to partially enclose at least a portion thereof;
a frame insert within said case portion defining a slot adapted to receive the camera surface upon insertion of the camera into said case portion; and
means associated with said frame insert having a spring bias toward a predetermined position for automatically engaging and latching the camera surface upon insertion of the camera into said case portion.

5. In a carrying case for a photographic camera having a lug projecting from one side thereof, comprising:
a case portion having bottom and side walls adapted to slidably receive the camera and at least partially enclose the same;
means in said case portion adapted to slidably receive the lug when the camera is inserted in said case portion;
retaining means associated with the last said means for automatically engaging and retaining the lug upon insertion of the camera into said case portion; and
means for releasing said retaining means to facilitate removal of the camera from said case portion.

6. In a carrying case for a photographic camera defining a projection on one wall thereof, the combination comprising:
a case portion having bottom and side walls and dimensions generally complemental to the camera for slidably receiving and at least partially enclosing the same;
a frame insert within said case portion defining an integral flexible arm adapted to be engaged and displaced by the projection upon insertion of the camera into said case portion; and
means on said arm cooperative with the projection of the camera to retain the camera within said case portion.

7. In a carrying case for a photographic camera as claimed in claim 6 wherein said means comprises an integral lip on said arm.

8. In a carrying case for a photographic camera as claimed in claim 6 wherein said frame insert defines a slot for receiving the projection.

9. In a carrying case for a photographic camera as claimed in claim 6 wherein said flexible arm defines an integral extension extending exteriorly of said case portion for manually positioning said arm to facilitate removal of the camera from said case portion.

10. In a carrying case for a photographic camera having a projecting surface on one side thereof, the combination comprising:
a case portion including bottom and side walls for receiving the camera;
a camera retaining arm pivotally mounted on one side wall of said case portion and defining an integral latching portion defining a latching surface a resilient portion engaging said bottom wall of said case portion for biasing said arm toward pivotal displacement in a predetermined direction, and an integral manually actuable portion for pivotally displacing said member in a direction opposite to said predetermined direction;
said member being positioned in said case portion whereby said latching portion is engaged by the projecting surface of the camera upon insertion of the camera into said case portion to displace said arm in said opposite direction against the bias of said resilient portion;
said resilient portion being effective to cause latching engagement of said latching portion with the projecting surface when the camera is fully positioned in said case portion.

11. In a carrying case for a photographic camera as claimed in claim 10 further including a frame insert fixed to one wall of said case portion and defining a slot for slidably receiving said projecting surface, said retaining arm being positioned between said insert and said one wall.

12. In a carrying case for a photographic camera having a projection on one wall thereof, the combination comprising:
a case portion defining bottom and side walls for receiving the camera, said bottom wall defining an opening adjacent one end wall;
a flexible spring arm in said case portion having one end fixed to said one end wall and the other end thereof extending into said opening; and
an integral retaining lip formed on said arm adapted to be engaged by the projection upon insertion of the camera into said case portion.

13. A carrying case for a photographic camera, comprising:
a case portion including bottom and side walls for receiving the camera, one of said side walls having an opening therein;
a latching member supported on said case portion and having a camera engaging portion movable into latching engagement with the camera, at least one resilient portion for urging said camera engaging portion toward latching engagement with the camera to automatically latch the camera in said case portion upon insertion thereof; and a manually actuatable portion extending through said opening for moving said engaging portion out of engagement with the camera to facilitate removal of the camera from said case portion.

14. In a carrying case for a photographic camera defining a surface for facilitating retention of the camera within the case, the combination comprising:
a case portion comprising a molded plastic part defining a bottom wall, a pair of end walls, and a rear wall and having dimensions generally complemental to the camera for slidably receiving the same;
a frame insert fixed to one of said walls within said case portion defining a slot adapted to receive the camera surface upon insertion of the camera into said case portion; and means associated with said frame insert having a spring bias toward a predetermined position for automatically engaging and latching the camera surface upon insertion of the camera into said case portion.

15. In a carrying case for a photographic camera, as claimed in claim 14, wherein said case portion has generally open front and top areas to permit usage of the camera; and further including a flexible cover flap having one end fixed to said bottom wall and the other end thereof adapted to be detachably retained on rear wall to substantially enclose the front and top areas of said case portion.

16. A carrying case for a photographic camera defining a surface to facilitate retention of the camera within the case comprising:

a case portion having bottom and side walls for slidably receiving the camera to enclose at least a portion of the camera;

retaining means movably supported on said case portion for engaging the camera surface when the camera is received by said case portion; and means for biasing said retaining means toward engagement with the camera surface to cause said retaining means to automatically engage the camera surface when the camera is received by said case portion.

References Cited

UNITED STATES PATENTS

| | | | |
|---|---|---|---|
| 495,412 | 4/1893 | Hiser | 292—128 |
| 724,466 | 4/1903 | Hannan et al. | 292—128 |
| 1,260,737 | 3/1918 | White. | |
| 2,249,132 | 7/1941 | Haslaw. | |
| 2,681,600 | 6/1954 | Heidecke | 150—52.8 X |
| 3,053,299 | 9/1962 | Lang | 150—52.8 |
| 3,291,179 | 12/1966 | Lang | 150—52.8 |

DAVIS T. MOORHEAD, *Primary Examiner.*

U.S. Cl. X.R.

24—230; 95—11; 292—128